United States Patent
Kim et al.

(10) Patent No.: US 9,472,802 B2
(45) Date of Patent: Oct. 18, 2016

(54) SECONDARY BATTERY

(75) Inventors: Dukjung Kim, Yongin-si (KR); In Kim, Yongin-si (KR)

(73) Assignees: SAMSUNG SDI CO., LTD., Yongin-Si, Gyeonggi-Do (KR); ROBERT BOSCH GmbH, Stuttgart (DE)

(*) Notice: Subject to any disclaimer, the term of this patent is extended or adjusted under 35 U.S.C. 154(b) by 1019 days.

(21) Appl. No.: 13/344,892

(22) Filed: Jan. 6, 2012

(65) Prior Publication Data

US 2013/0029188 A1  Jan. 31, 2013

Related U.S. Application Data

(60) Provisional application No. 61/511,264, filed on Jul. 25, 2011.

(51) Int. Cl.

| | |
|---|---|
| *H01M 2/34* | (2006.01) |
| *H01M 2/32* | (2006.01) |
| *H01M 2/06* | (2006.01) |
| *H01M 2/12* | (2006.01) |
| *H01M 2/18* | (2006.01) |
| *H01M 2/02* | (2006.01) |
| *H01M 2/26* | (2006.01) |
| *H01M 10/04* | (2006.01) |
| *H01M 10/0587* | (2010.01) |
| *H01M 2/16* | (2006.01) |

(52) U.S. Cl.
CPC ............ *H01M 2/347* (2013.01); *H01M 2/028* (2013.01); *H01M 2/0217* (2013.01); *H01M 2/06* (2013.01); *H01M 2/1235* (2013.01); *H01M 2/18* (2013.01); *H01M 2/32* (2013.01); *H01M 2/1653* (2013.01); *H01M 2/263* (2013.01); *H01M 10/0431* (2013.01); *H01M 10/0587* (2013.01)

(58) Field of Classification Search
CPC .... H01M 2/32; H01M 2/028; H01M 2/1235; H01M 2/18; H01M 2/347; H01M 2/06; H01M 2/0217
See application file for complete search history.

(56) References Cited

U.S. PATENT DOCUMENTS

| | | |
|---|---|---|
| 2006/0024568 A1 | 2/2006 | Lee |
| 2006/0024578 A1 | 2/2006 | Lee |
| 2006/0115722 A1 | 6/2006 | Kim |
| 2007/0196729 A1 | 8/2007 | Yamauchi et al. |

(Continued)

FOREIGN PATENT DOCUMENTS

| | | |
|---|---|---|
| CN | 1783534 A | 6/2006 |
| CN | 101404338 A | 4/2009 |

(Continued)

OTHER PUBLICATIONS

Machine translation of JP 2009170137A (Jul. 2009), relied upon in the rejection.*

(Continued)

*Primary Examiner* — Eugenia Wang
(74) *Attorney, Agent, or Firm* — Lee & Morse, P.C.

(57) ABSTRACT

A secondary battery includes an electrode assembly, the electrode assembly including an uncoated region at ends thereof; a case accommodating the electrode assembly; a cap plate coupled with the case; and an insulation member in the case, the insulation member including a first region between the electrode assembly and the cap plate, and a second region between the uncoated region of the electrode assembly and an inner surface of the case.

19 Claims, 12 Drawing Sheets

(56) References Cited

U.S. PATENT DOCUMENTS

| | | |
|---|---|---|
| 2009/0087733 A1 | 4/2009 | Yoon et al. |
| 2009/0186269 A1 | 7/2009 | Kim et al. |
| 2010/0143786 A1* | 6/2010 | Kim .......................... 429/158 |
| 2010/0167107 A1* | 7/2010 | Byun et al. ................ 429/56 |
| 2011/0052975 A1 | 3/2011 | Lee |
| 2011/0086265 A1 | 4/2011 | Suzuki |
| 2011/0117421 A1 | 5/2011 | Kim et al. |

FOREIGN PATENT DOCUMENTS

| | | | |
|---|---|---|---|
| EP | 2 317 588 A1 | 5/2011 | |
| EP | 2333866 A1 | 6/2011 | |
| JP | 2006-040899 A | 2/2006 | |
| JP | 2009-152006 A | 7/2009 | |
| JP | 2009-170137 A | 7/2009 | |
| JP | 2009170137 A | * | 7/2009 |
| JP | 2011-049064 A | 3/2011 | |
| JP | 2011-049066 A | 3/2011 | |
| JP | 2011-054567 A | 3/2011 | |
| KR | 10-2007-0083415 A | 8/2007 | |
| KR | 10-2010-0065669 A | 6/2010 | |
| KR | 10-2010-0076699 A | 7/2010 | |

OTHER PUBLICATIONS

European Search Report in EP 12161635.3-1359/2551940, dated Jan. 7, 2014 (Kim, et al.).

European Office Action dated Mar. 16, 2016 in Corresponding European Patent Application No. 12161635.3.

* cited by examiner

SECONDARY BATTERY

CROSS-REFERENCE TO RELATED APPLICATION

The present application claims priority under 35 U.S.C. §119(e) to U.S. Provisional Application No. 61/511,264, filed on Jul. 25, 2011, and entitled: "Secondary Battery," which is incorporated herein by reference in its entirety.

BACKGROUND

1. Field

Embodiments relate to a secondary battery.

2. Description of the Related Art

Unlike a primary battery that is not chargeable, a secondary battery may be chargeable and dischargeable. Lower power secondary batteries may be made into battery packs and used as a power source for various portable electronic devices e.g. cellular phones or camcorders. Larger sized batteries having dozens of battery cells connected to each other may be used as the power source for a motor drive, e.g., in electric scooters or hybrid electric vehicles.

The secondary batteries may be manufactured into various types, including cylindrical and prismatic types depending on the shape of a battery case. The secondary battery may be formed by accommodating an electrode assembly (having a positive electrode plate, a negative electrode plate, and a separator therebetween) with an electrolyte in a case, and installing a cap plate in the case. A positive electrode terminal and a negative electrode terminal may be connected to the electrode assembly and may be exposed or protrude outside through the cap plate.

SUMMARY

Embodiments are directed to a secondary battery.

The embodiments may be realized by providing a secondary battery including an electrode assembly, the electrode assembly including an uncoated region at ends thereof; a case accommodating the electrode assembly; a cap plate coupled with the case; and an insulation member in the case, the insulation member including a first region between the electrode assembly and the cap plate, and a second region between the uncoated region of the electrode assembly and an inner surface of the case.

The insulation member may be coupled with the cap plate.

The first region may include a terminal protrusion in a cap plate terminal hole of the cap plate, the terminal protrusion including an insulation member terminal hole therethrough, and a coupling protrusion, the coupling protrusion being coupled with a coupling recess of the cap plate.

The first region may further include a vent hole under a vent plate of the cap plate, an insulation member injection hole under a cap plate injection hole of the cap plate.

The insulation member may form a gas passage that directs gas generated during charging/discharging of the secondary battery toward the vent hole.

The first region may include a thick rim part extending downwardly along sides thereof.

The second region may extend downwardly from ends of the first region.

The second region may include a second region back plate between the uncoated region of the electrode assembly and a narrow side of the case, and a second region lateral plate extending inwardly from the second region back plate.

The second region lateral plate may extend between sides of the uncoated region of the electrode assembly and a wide side of the case.

The second region may include a reinforcing member at a junction between the second region back plate and the second region lateral plate.

The second region back plate may have a width equal to or greater than a width of the uncoated region.

The second region lateral plate may extend to cover an entire wide side of the electrode assembly.

The insulation member may further include a third region opposite to the first region, the third region being between a bottom side of the electrode assembly and the inner surface of the case.

The third region may extend inwardly from ends of the second region.

The third region may include a third region bottom plate between the uncoated region of the electrode assembly and a bottom surface of the case.

The third region bottom plate may have a width equal to or greater than a width of the uncoated region of the electrode assembly.

The third region bottom plate may extend to cover an entire bottom side of the electrode assembly.

The third region may be foldable from one position longitudinal with the second region in an unassembled condition to another position normal to the second region in an assembled condition.

The insulation member may be formed from a phenol resin, polyphenylene sulfide, polyether ether ketone, polyether ketone, polyoxymethylene, or combinations thereof.

The insulation member may have a one-piece, integrally formed structure.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1A:
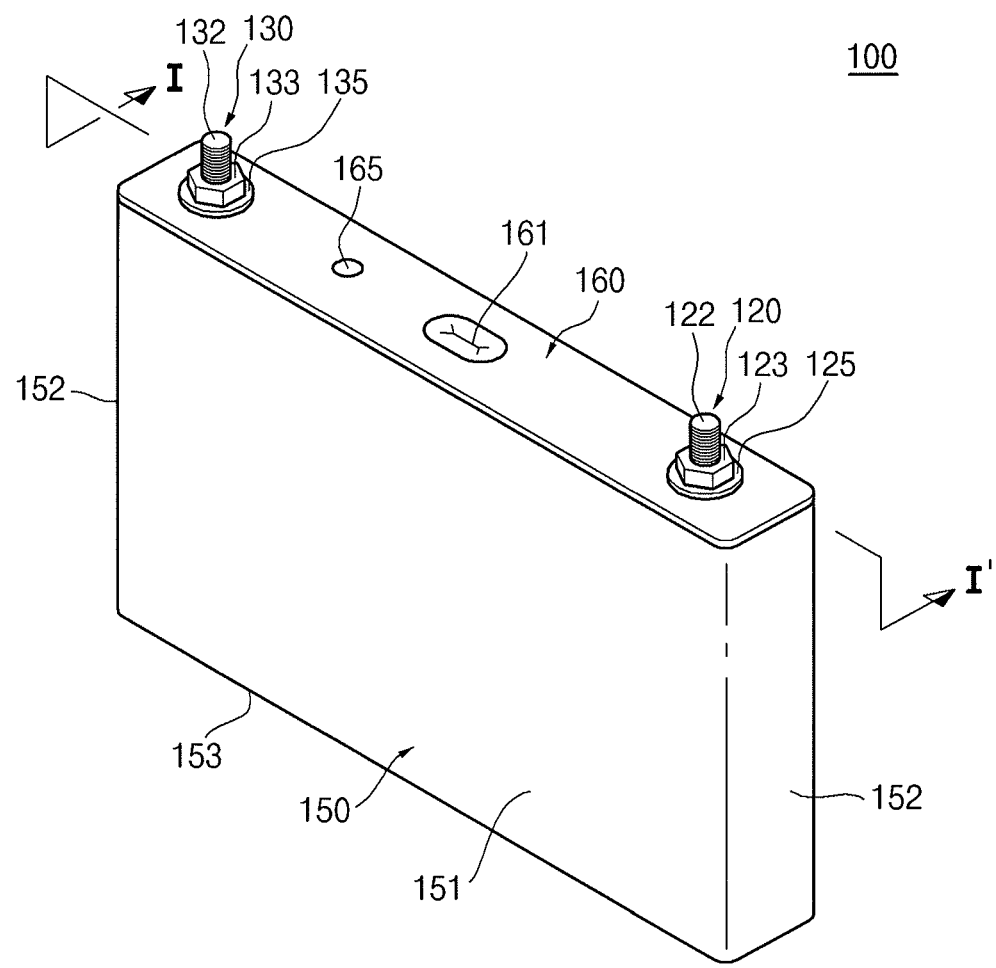
FIG. 1A illustrates a perspective view of a secondary battery according to an embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening element may also be present. Like reference numerals refer to like elements throughout.

Figure 1B:
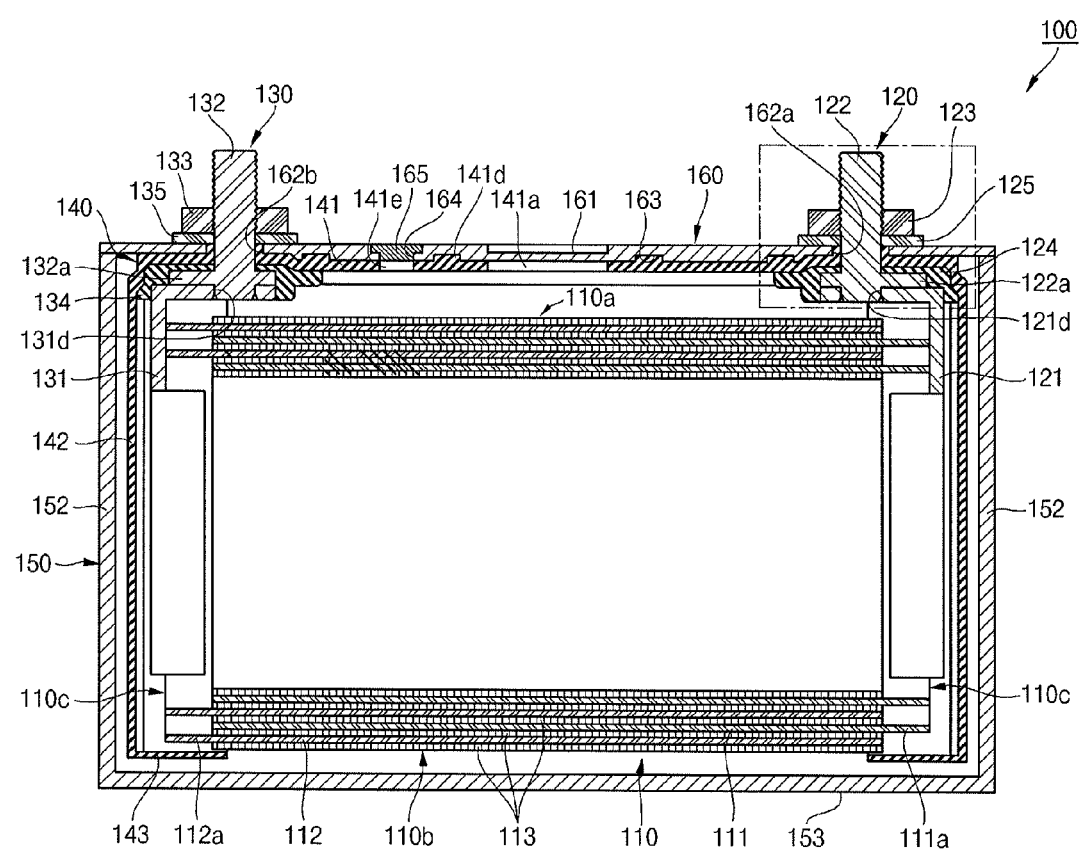
FIG. 1B illustrates a sectional view of the secondary battery of FIG. 1A.
Figure 1C:
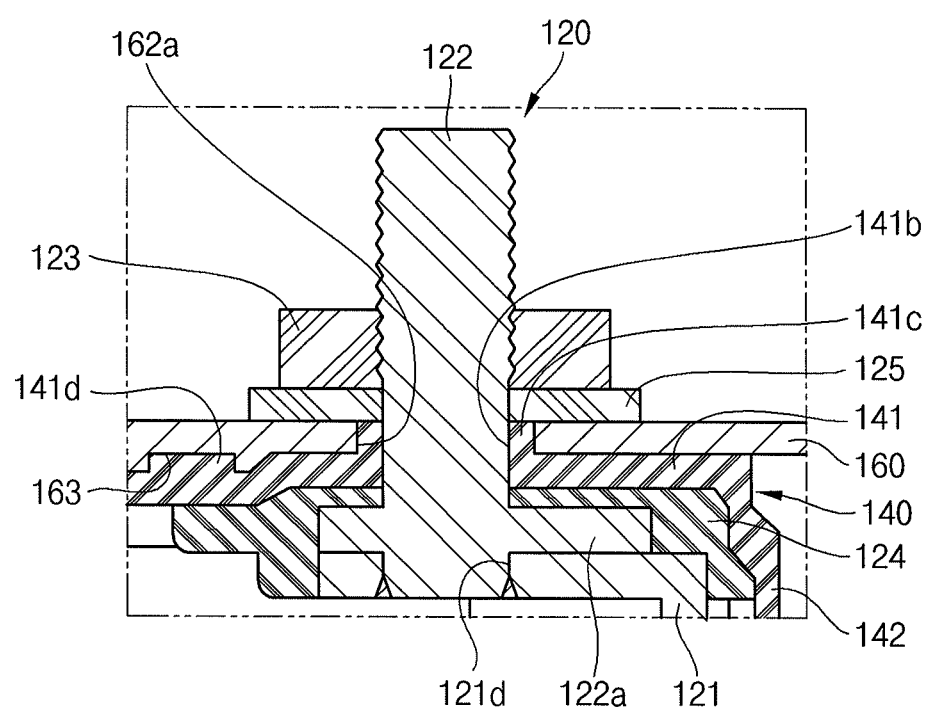
FIG. 1C illustrates a partly enlarged view of the secondary battery of FIG. 1B.

FIG. 1A illustrates a perspective view of a secondary battery according to an embodiment. FIG. 1B illustrates a sectional view of the secondary battery of FIG. 1A. FIG. 1C illustrates a partly enlarged view of the secondary battery of FIG. 1B.

As shown in FIGS. 1A, 1B, and 1C, the secondary battery according to an embodiment may include an electrode assembly 110, a first electrode terminal 120 (e.g., a positive electrode terminal), a second electrode terminal 130 (e.g., a negative electrode terminal), an insulation member 140, a case 150, and a cap plate 160.

The electrode assembly 110 may be formed by winding or laminating a stacked structure including a first electrode plate 111, a separator 113, and a second electrode plate 112. In an implementation, the first electrode plate 111 may serve as a positive electrode and the second electrode plate 112 may serve as a negative electrode, or vice versa. In addition, the electrode assembly 110 may have a substantially hexahedral shape having opposite side regions facing each other (an uncoated portion or region), a top region above the opposite side regions, and a bottom region opposite to the top region.

The first electrode plate 111 may be formed by coating a first electrode active material (made from, e.g., a transition metal oxide) on a first electrode collector (made from a metallic foil, e.g. aluminum foil) and may include a first electrode uncoated region or portion 111a that is not coated with the first electrode active material. The first electrode uncoated portion 111 a may become a path of current flow between the first electrode plate 111 and an outside of the first electrode plate 111. The material of the first electrode plate 111 is not limited to those listed herein.

The second electrode plate 112 may be formed by coating a second electrode active material (made from, e.g., graphite or a carbon material) on a second electrode collector (made from a metallic foil, e.g., copper or nickel) and may include a second electrode uncoated region or portion 112a that is not coated with the second electrode active material. The second electrode uncoated portion 112a may become a path of current flow between the second electrode plate 112 and an outside of the second electrode plate 112. The material of the second electrode plate 112 is not limited to those listed herein. The first electrode plate 111 and the second electrode plate 112 may have different polarities.

The separator 113 may prevent an electric short between the first electrode plate 111 and the second electrode plate 112 and may allow only lithium ions to pass. The separator 113 may be formed from, e.g., polyethylene (PE), polypropylene (PP) or a composite film of polyethylene (PE) and polypropylene (PP). The material of the separator 113 is not limited to those listed herein.

A first electrode terminal 120 and a second electrode terminal 130 (electrically connected to the first electrode plate 111 and the second electrode plate 112, respectively) may be coupled with opposite ends of the electrode assembly 110.

The electrode assembly 110 may be accommodated in the case 150 together with an electrolyte. The electrolyte may include a lithium salt (e.g., $LiPF_6$ or $LiBF_4$) and an organic solvent (e.g., ethylene carbonate (EC), propylene carbonate (PC), diethyl carbonate (DEC), ethyl methyl carbonate (EMC), or dimethyl carbonate (DMC)). In an implementation, the electrolyte may be in a liquid, solid, or gel phase.

The first electrode terminal 120 may be made from a metal or equivalents thereof and may be electrically connected to the first electrode plate 111. The first electrode terminal 120 may include a first collector plate 121, a first collector terminal 122, and a first fastening member 123.

The first collector plate 121 may contact the first electrode uncoated portion 111a that protrudes at one end of the electrode assembly 110. The first collector plate 121 may be welded to the first electrode uncoated portion 111a. The first collector plate 121 may be substantially L-shaped and may include a terminal hole 121d on a top portion thereof. The first collector terminal 122 may be fitted into the terminal hole 121d. The first collector plate 121 may be made from, e.g., aluminum, or an aluminum alloy. However, the material of the first collector plate 121 is not limited to those listed herein.

The first collector terminal 122 may pass through the cap plate 160 (described below) and may extend and protrude upwardly by a predetermined length. In addition, the first collector terminal 122 may be electrically connected to the first collector plate 121 under the cap plate 160. The first collector terminal 122 may have a laterally extending flange 122a under the cap plate 160 to help prevent the first collector terminal 122 from being dislodged from the cap plate 160 as the first collector terminal 122 extends and protrudes upwardly from a top surface of the cap plate 160 by a predetermined length. A region of the first collector terminal 122 under the flange 122a may be fitted into the terminal hole 121d of the first collector plate 121 to then be riveted or welded therewith. In addition, a region of the first collector terminal 122 on the flange 122a may pass through the cap plate 160 and may extend and protrude upwardly by the predetermined length. A first fastening member 123 may be fixed at the extending and protruding region. In addition, a thread may be formed at an upper extending region of the first collector terminal 122, thereby facilitating coupling of the first fastening member 123 with the first collector terminal 122. Here, the first collector terminal 122 may be electrically isolated from or electrically connected to the cap plate 160. The first collector terminal 122 may be formed from, e.g., aluminum, an aluminum alloy, and/or equivalents thereof. However, the material of the first collector terminal 122 is not limited thereto.

The first fastening member 123 may have a substantially hexagonal nut shape and may include a centrally formed perforation hole in a substantially perpendicular direction to allow the first collector terminal 122 to pass therethrough and to be coupled thereto. The first fastening member 123 may be formed from, e.g., stainless steel, aluminum, an aluminum alloy, copper, a copper alloy, and/or equivalents thereof. However, the material of the first fastening member 123 is not limited thereto. In addition, the first fastening member 123 may be electrically disconnected from or connected to the cap plate 160.

A first lower insulation member 124 may be disposed between the flange 122a of the first collector terminal 122 and the cap plate 160. A first upper insulation member 125 may be disposed between the cap plate 160 and the first fastening member 123. The first lower insulation member 124 may electrically isolate the flange 122a of the first collector terminal 122 and the first collector plate 121 from the cap plate 160. The first upper insulation member 125 may electrically isolate the cap plate 160 from the first fastening member 123.

The second electrode terminal 130 may be formed from a metal or equivalents thereof and may be electrically connected to the second electrode plate 112. The second electrode terminal 130 may include a second collector plate 131, a second collector terminal 132, a second upper insulation member 135 (like the first upper insulation member 125 of the first electrode terminal 120), and a second fastening member 133. The second electrode terminal 130 may have the same shape as the first electrode terminal 120, and a repeated detailed description thereof is omitted. The second collector plate 131 and the second collector terminal 132 may be formed from, e.g., copper, a copper alloy, and/or equivalents thereof. However, the material of the second collector plate 131 and the second collector terminal 132 is not limited thereto. In addition, the second fastening member 133 may be formed from, e.g., stainless steel, aluminum, an aluminum alloy, copper, a copper alloy, and/or equivalents thereof. However, the material of the second fastening member 133 is not limited thereto. The second collector terminal 132 may have a laterally extending flange 132a under the cap plate 160 (like laterally extending flange 122a of the first collector terminal 122). The second collector plate 131 may be substantially L-shaped (like the first collector plate 121) and may include a terminal hole 131d on a top portion thereof (like the terminal hole 121d). A second lower insulation member 134 (like the first lower insulation member 124) may be disposed between the flange 132a of the second collector terminal 132 and the cap plate 160.

The insulation member 140 may roughly cover the electrode assembly 110 to electrically insulate the electrode assembly 110 from the case 150. In addition, the insulation member 140 may be disposed between each of the first and second electrode terminals 120 and 130 and the cap plate 160. Thus, the insulation member 140 may electrically insulate the first and second electrode terminals 120 and 130 from the cap plate 160.

The insulation member 140 may formed from a material that is not melted in an electrolyte, e.g., a material that does not react with electrolyte. For example, the insulation member 140 may be formed from phenol resin, polyphenylene sulfide, polyether ether ketone, polyether ketone, polyoxymethylene, and/or equivalents thereof. However, the material of the insulation member 140 is not limited thereto.

The insulation member 140 may include a first region 141 and a second region 142. In an implementation, the insulation member 140 may further include a third region 143. The insulation member 140 may have a one-piece, integrally formed structure.

The first region 141 may be between a top region 110a of the electrode assembly 110 and the cap plate 160 to electrically insulate the top region 110a of the electrode assembly 110 from the cap plate 160. For example, the insulation member 140 may be coupled with the cap plate 160.

The first region 141 may include a terminal protrusion 141c corresponding to a location of a cap plate terminal hole 162a, 162b in the cap plate 160. The terminal protrusion 141c may include an insulation member terminal hole 141b therein to allow the pillar-shaped current collector terminal 122, 132 to pass therethrough.

In an implementation, the first region 141 may have a vent hole 141a at a location corresponding to, e.g., under, a relatively thin safety vent 161 in the cap plate 160. The vent hole 141a may allow gas (generated due to overcharge of the secondary battery) to be rapidly discharged outside of the secondary battery through the safety vent 161.

The first region 141 may include a coupling protrusion 141d coupled with a coupling recess 163 in the cap plate 160. The coupling protrusion 141d may help prevent the insulation member 140 from being separated from the cap plate 160.

The first region 141 may include an insulation member injection hole 141e at a location corresponding to, e.g., under, a cap plate injection hole 164 in the cap plate 160. The insulation member injection hole 141e may allow an electrolyte to rapidly flow to the electrode assembly 110 when the electrolyte is injected through the cap plate injection hole 164.

The second region 142 may extend downwardly from opposite ends of the first region 141. The second region 142 may be positioned between opposite side regions 110c of the electrode assembly 110 (e.g., the uncoated region 111a and 111b and side regions of the case, i.e., short-side portions or narrow sides 152). Therefore, the second region 142 may electrically insulate the opposite side regions 110c of the electrode assembly 110 from the case 150. For example, the second region 142 may be between the first collector plate 121 and one narrow side of the case 150 and between the second collector plate 131 and another narrow side of the case 150. Thus, the first and second collector plates 121 and 131 may be electrically insulated from the narrow sides 152 of the case 150.

The third region 143 may extend from, e.g., ends of, the second region 142 to then be positioned between a bottom side or region 110b of the electrode assembly 110 and an inner surface of a bottom side 153 of the case 150. Therefore, the third region 143 may electrically insulate the bottom region 110b of the electrode assembly 110 from the inner surface of the case 150. For example, the third region 143 may be between the uncoated region 111a and 112a at sides of the electrode assembly 110 and the inner surface of the case 150 to electrically insulate the uncoated region 111a and 112a from the inner surface of the case 150.

In an implementation, the third region 143 may be elongated to be in proximity to or to overlap other, opposing, portions thereof. For example, the third region 143 may extend to cover an entire bottom side of the electrode assembly 110.

The case 150 may be formed from a conductive metal, e.g., aluminum, an aluminum alloy, and/or nickel plated steel. The case 150 may have a substantially hexagonal or hexahedral shape and may include a top opening to receive the first electrode terminal 120 and the second electrode terminal 130. The opening of the case 150 may be sealed by the cap plate 160, thereby protecting the electrode assembly 110 and electrolyte placed within the case 150 from external surroundings. The case 150 may have two wide side surfaces 151 (corresponding to two wide side surfaces of the electrode assembly 110), two narrow sides 152 (corresponding to the opposite side regions of the electrode assembly 110), and the bottom surface 153 (corresponding to a bottom region of the electrode assembly 110). In addition, an insulation coating layer (not shown) may be further formed on inner surfaces of the case 150 and the cap plate 160. Thus, the case 150 and the cap plate 160 may be more electrically insulated from the electrode assembly 110, the first electrode terminal 120, and the second electrode terminal 130.

The cap plate 160 may be coupled with and/or seal the opening of the case 150 above the top region or side 110 of the electrode assembly 110, thereby protecting the electrode assembly 110 and electrolyte from external surroundings. The cap plate 160 may include the relatively thin safety vent 161 (substantially centered on the cap plate 160) and cap plate terminal holes 162a and 162b at the opposite side regions of the cap plate 160 to allow the first collector terminal 122 and the second collector terminal 132 to pass therethrough. As described above, the vent hole 141a may be formed in the first region 141 of the insulation member 140 to correspond to the safety vent 161. In addition, the terminal protrusion 141c including the insulation member terminal hole 141b therethrough may correspond to the terminal holes 162a and 162b of the cap plate 160. In addition, the cap plate 160 may include at least one coupling recess 163 between the safety vent 161 and the terminal holes 162a and 162b. As described above, the coupling protrusion 141d may be formed at a location of the first region 141 that corresponds to the at least one coupling recess 163 and the coupling protrusion 141d may be coupled with the coupling recess 163. In addition, the cap plate 160 may include the cap plate injection hole 164 at a location spaced apart from the safety vent 161, and a plug 165 may be coupled with the cap plate injection hole 164. As described above, the insulation member injection hole 141e may be formed in the first region 141 at a location corresponding to the cap plate injection hole 164.

The cap plate 160 may be formed from the same material as the case 150.

Therefore, the cap plate 160 may be welded to the case 150 by, e.g., laser welding. As described above, the cap plate 160 may be electrically connected the first electrode terminal 120 to have the same polarity as the first electrode terminal 120. Thus, the cap plate 160 and the case 150 may have the same polarity.

As shown in FIG. 1C, the terminal protrusion 141c of the insulation member 140 may be inserted into the cap plate terminal hole 162a. The insulation member terminal hole 141b may extend through the terminal protrusion 141c. The first region 141 of the insulation member 140 may closely contact a bottom surface of the cap plate 160. In addition, the upper insulation member 125 may closely contact the cap plate 160, and the lower insulation member 124 may closely contact a bottom surface of the first region 141 of the insulation member 140.

The pillar-shaped first collector terminal 122 of the first electrode terminal 120 may extend and pass through the lower insulation member 124, the first region 141 of the insulation member 140, the terminal protrusion 141c, and the upper insulation member 125. Thus, the first collector terminal 122 may be electrically insulated from the cap plate 160 by the lower insulation member 124, the first region 141 of the insulation member 140, the terminal protrusion 141c, and the upper insulation member 125.

When it is desired that the first electrode terminal 120 and the cap plate 160 have the same polarity, a portion of the first fastening member 123 coupled to the first collector terminal 122 may extend to contact the cap plate 160.

Figure 2A:
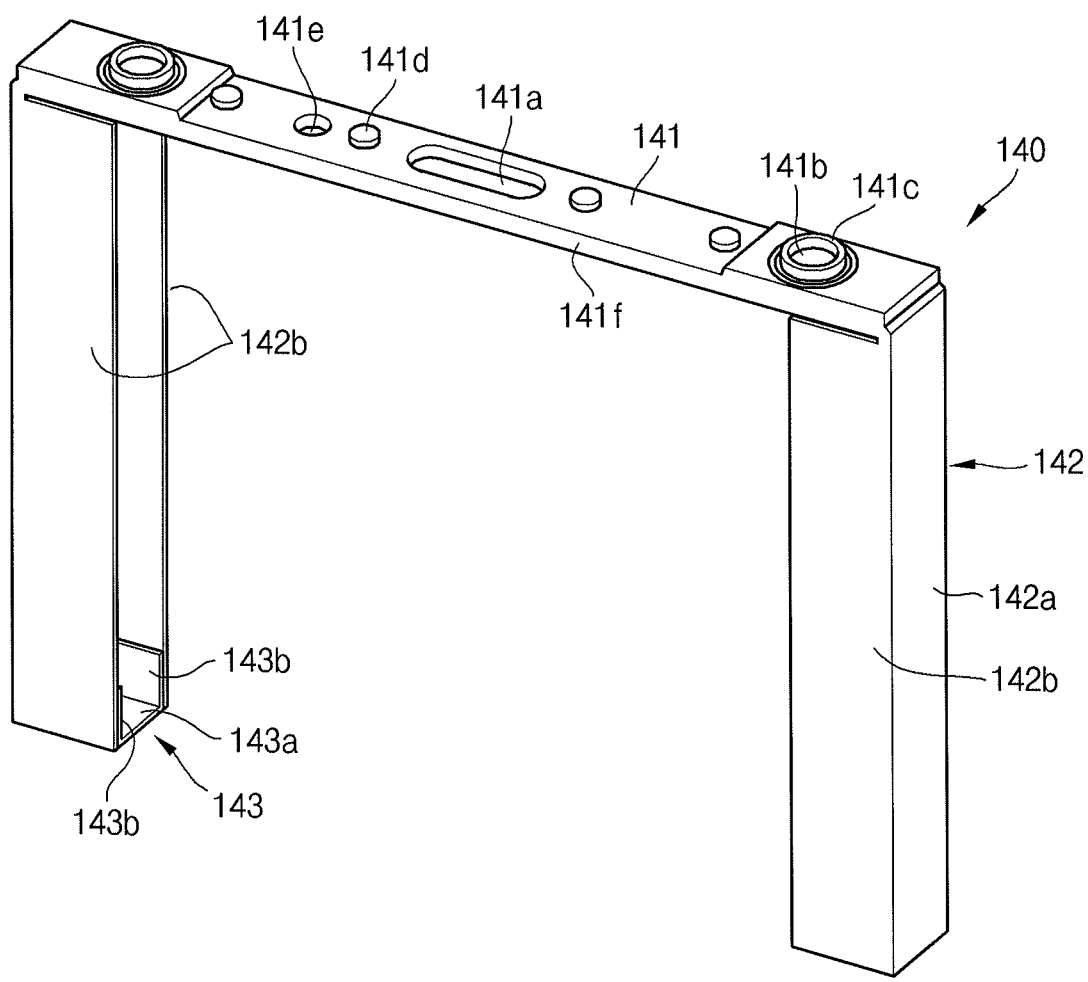
FIG. 2A illustrates a perspective view of an insulation member of the secondary battery of FIG. 1A.
Figure 2B:
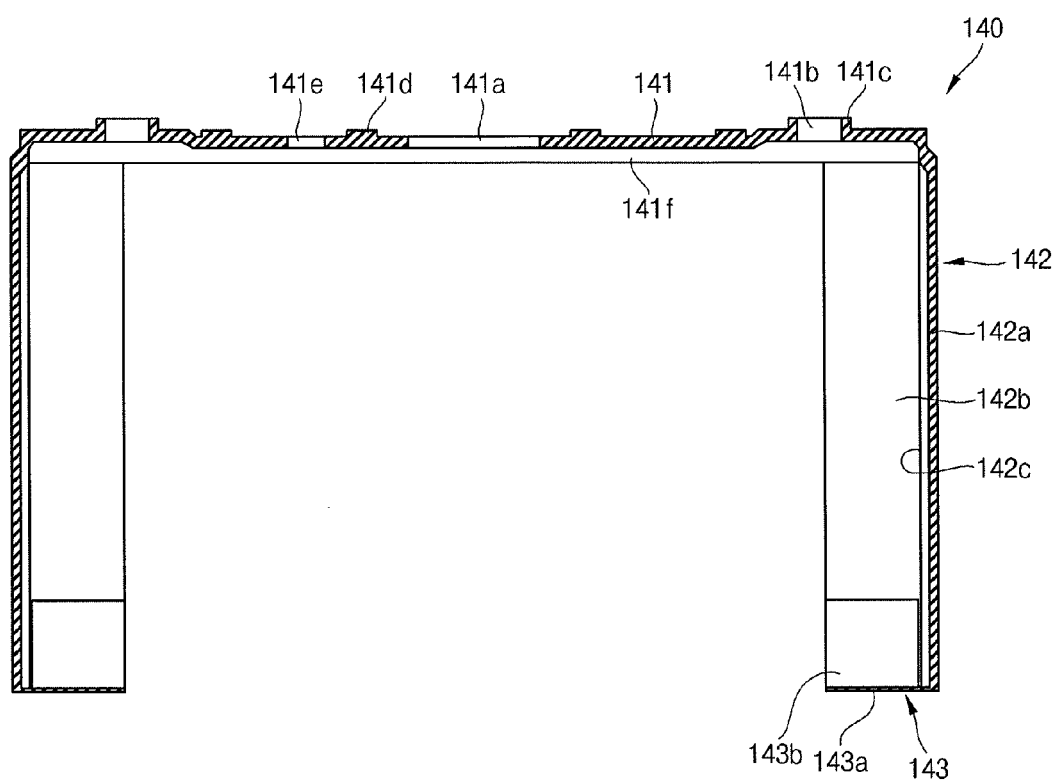
FIG. 2B illustrates a sectional view of the insulation member of FIG. 2A.
Figure 2C:
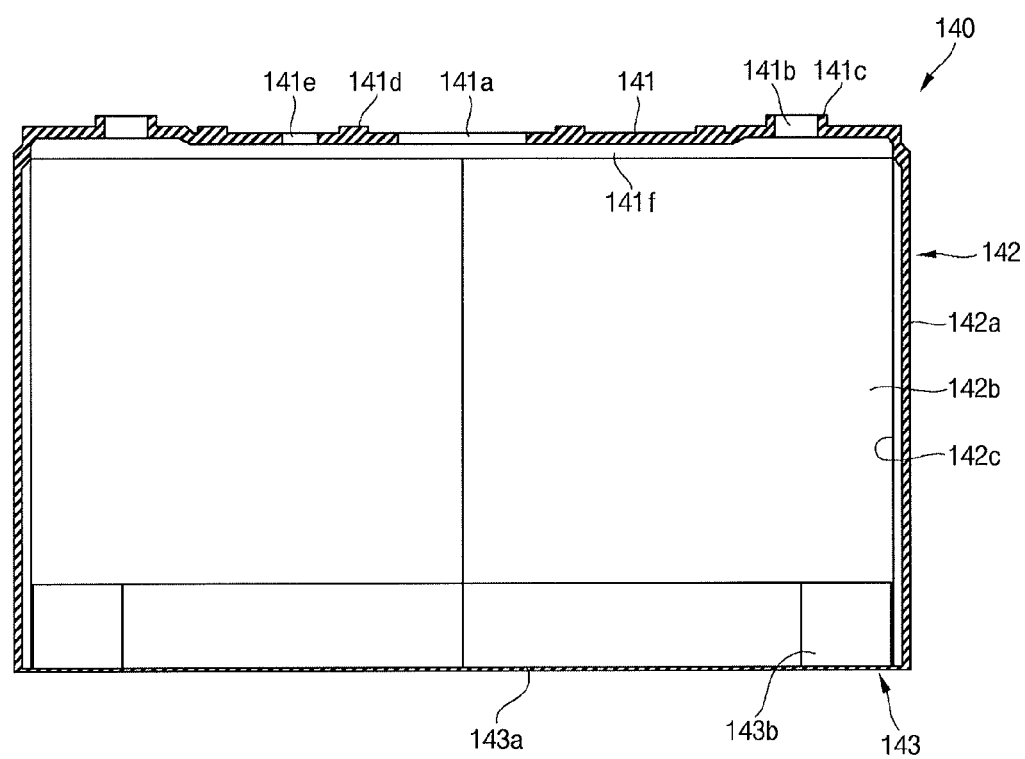
FIG. 2C illustrates a sectional view of a modified version of the insulation member of FIG. 2A.

FIG. 2A illustrates a perspective view of an insulation member of the secondary battery of FIG. 1A. FIG. 2B illustrates a sectional view of the insulation member of FIG. 2A.

As shown in FIGS. 2A and 2B, the insulation member 140 may include the first region 141, the second region 142 (extending from ends of the first region 141), and the third region 143 (extending from the second region 142). In the assembled condition, the third region 143 may be substantially parallel with the first region 141.

In addition, the vent hole 141a may be formed in the first region 141 in an area corresponding to the safety vent 161 of the cap plate 160. In addition, the terminal protrusion 141c including the insulation member terminal hole 141b may be formed at sides of the vent hole 141a to allow the pillar-shaped first and second current collector terminals 122 and 132 to pass therethrough. In addition, the coupling protrusion 141d (corresponding to the coupling recess 163 of the cap plate 160) may be formed between the vent hole 141a and the terminal protrusion 141c. In addition, the insulation member injection hole 141e may be formed at the location corresponding to the cap plate injection hole 164. Further, the first region 141 may include a relatively thick rim part 141f formed lengthwise along a periphery thereof. For example, the rim part 141f may extend downwardly along sides of the first region 141. The rim part 141f may enhance a bending strength of the first region 141.

The second region 142 may include a substantially planar second region back plate 142a and a substantially planar second region lateral plate 142b. The second region back plate 142a may be formed at a region facing the opposite side regions 110c, e.g., ends, of the electrode assembly 110, and the second region lateral plate 142b may extend from the first plate 142a to cover sides of the uncoated region 111a and 112a of the electrode assembly 110. For example, the second region back plate 142a may correspond to the narrow side 152 of the case 150 and the second region lateral plate 142b may extend along the wide side 151 of the case 150.

In an implementation, the second region lateral plate 142b may have a width equal to or greater than a width of the uncoated region 111a and 112a. For example, the second region lateral plate 142b may be elongated to partially or completely cover wide sides of the electrode assembly 110.

The third region 143 may include a third region back plate 143a and a third region lateral plate 143b. The plates 143a and 143b may cover the uncoated region 111a and 112a of the electrode assembly 110. The plates 143a and 143b may have a width sufficient to the cover the uncoated region 111a and 112a of the electrode assembly 110. For example, the third region back plate 143a and the third region lateral plate 143b may be elongated to be in proximity to or to overlap other, opposing, portions thereof.

Figure 3A:
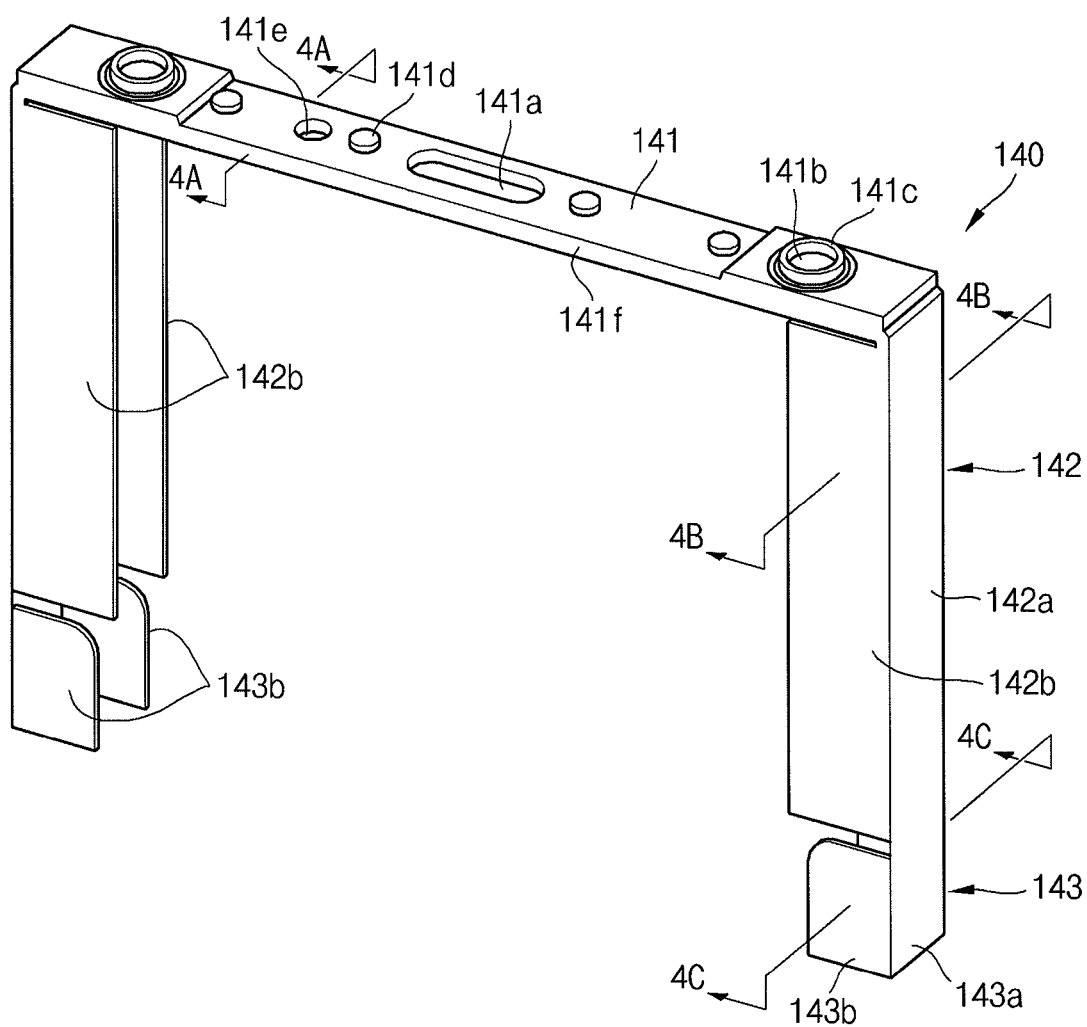
FIG. 3A illustrates a perspective view of an unassembled condition of the insulation member of FIG. 2A.
Figure 3B:
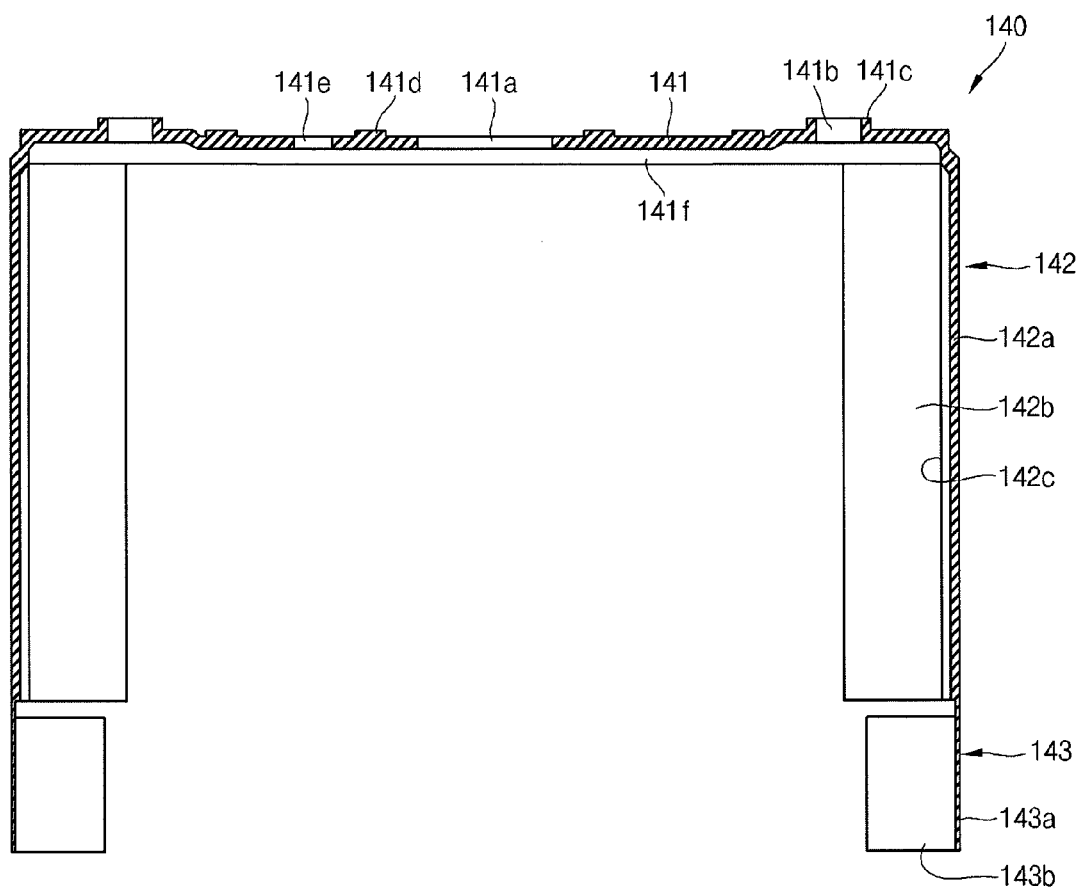
FIG. 3B illustrates a sectional view of the unassembled condition of the insulation member of FIG. 2A.

FIG. 3A illustrates a perspective view of an unassembled condition of the insulation member of FIG. 2A. FIG. 3B illustrates a sectional view of the unassembled condition of the insulation member of FIG. 2A.

As shown in FIGS. 3A and 3B, before the electrode assembly 110 is coupled with the insulation member 140, the third region 143 may extend in parallel with the second region 142. However, once the electrode assembly 110 is coupled with the insulation member 140, the third region 143 may be bent from the second region 142 at a substantially right angle. If the third region 143 is bent in such a manner, the secondary battery may be manufactured in a simplified manner. For example, the first electrode terminal 120 and the second electrode terminal 130 may be electrically connected to the electrode assembly 110 to then be coupled with the insulation member 140. Here, the electrode assembly 110 may be coupled with the insulation member 140 in a direction from a bottom to a top of the insulation member 140 shown in FIGS. 3A and 3B. The pillar-shaped first and second collector terminal 122, 132 may be coupled with the insulation member terminal hole 141b in the first region 141 of the insulation member 140. Next, the third region 143 may be bent at a substantially right angle with respect to the second region 142. In such a manner, the first region 141, the second region 142, and the third region 143 may substantially cover the uncoated region 111a and 112a. The second region 142 may also cover collector plates 121 and 131 connected to the current collector terminals 122 and 132.

According to the present embodiment, the second region lateral plate 142b may also be bent from the second region back plate 142a. For example, the second region lateral plate 142b may be bent at a predetermined angle with respect to the second region back plate 142a. Accordingly, the first and second collector plates 121 and 131 and the first and second current collector terminals 122 and 132 may be placed in the first region 141 and the second region 142, and the electrode assembly 110 may be placed in a space formed by the first region 141 and the second region 142. In such a state, the first and second collector plates 121 and 131 and the uncoated region 111a and 112a of the electrode assembly 110 may be welded to each other. Here, it is assumed that the first and second collector plates 121 and 131 are coupled with the first and second current collector terminals 122 and 132, respectively.

In a state in which the second region lateral plate 142b is pulled away from the electrode assembly 110, the first and second collector plates 121 and 131 may be welded to the uncoated region 111a and 112a of the electrode assembly 110. Once the welding is performed, the second region lateral plate 142b may again be in proximity to the uncoated region 111a, 112a of the electrode assembly 110 due to a restoration force.

The third region 143 may be foldable from one position longitudinal with the second region 142 in an unassembled condition to another position normal to the second region 142 in an assembled condition.

Figure 4A:
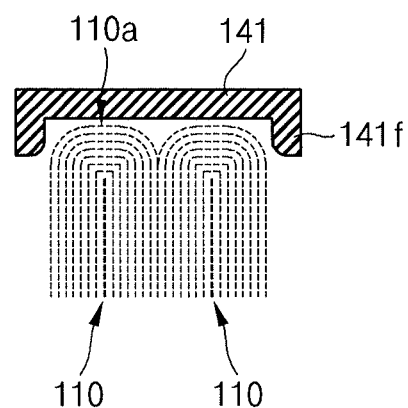
FIGS. 4A, 4B and 4C illustrate sectional views taken along lines 4A-4A, 4B-4B, and 4C-4C of FIG. 3A.
Figure 4B:
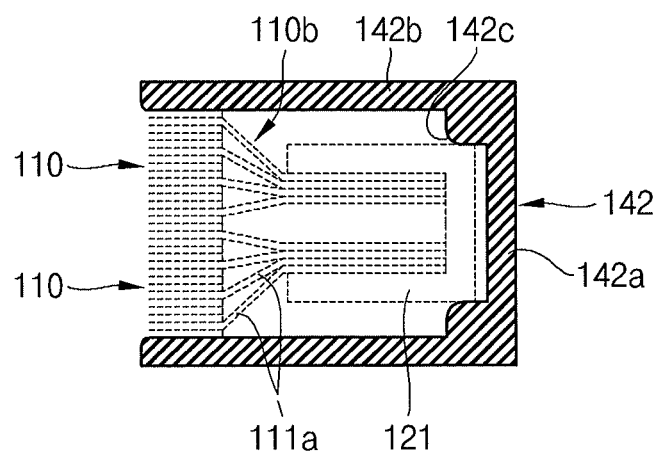
Figure 4C:
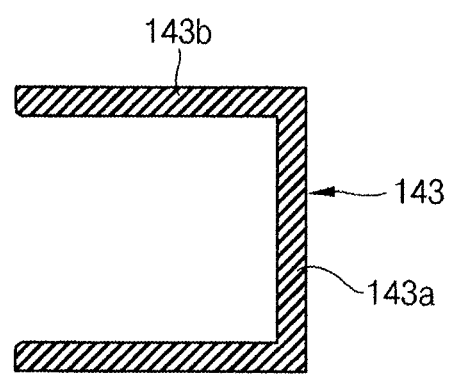

FIGS. 4A, 4B and 4C illustrate sectional views taken along lines 4A-4A, 4B-4B, and 4C-4C of FIG. 3A.

As shown in FIG. 4A, the top region 110a of at least one electrode assembly 110 may be positioned in a space formed by the first region 141 of the insulation member 140 and the rim part 141f at its periphery. Although FIG. 4A shows two electrode assemblies 110 are placed in the space, the embodiments are not limited thereto, and any suitable number of electrode assemblies may be used.

As shown in FIG. 4B, the opposite side regions 110c of the at least one electrode assembly 110 may be placed in a space formed by the second region back plate 142a and the second region lateral plate 142b. In addition, the uncoated region 111a of the electrode assembly 110 may be placed in the space formed by the second region back plate 142a and the second region lateral plate 142b, and the uncoated region 111a may be electrically connected to the collector plate 121. In an implementation, the uncoated region 111a may be welded to the collector plate 121. Further, a reinforcing member 142c may be formed at a boundary or junction between the second region back plate 142a and the second region lateral plate 142b, thereby increasing bending resistance of the second region 142. In addition, the space formed by the second region back plate 142a and the second region lateral plate 142b may serve as a gas exhaustion path or passage. Therefore, if gas is generated due to over-charge of the secondary battery, the generated gas may move upwardly along the second region 142 of the insulation member 140 to then be rapidly discharged to the outside of the secondary battery along the first region 141 of the insulation member 140 through the vent hole 141a and the safety vent 161. Here, the safety vent 161 may be ruptured by the gas pressure.

As shown in FIG. 4C, the third region 143 may be bent from the second region 142 at substantially right angle during the manufacturing process of the secondary battery. Here, the third region 143 may be thinner than the second region 142 for the purposes of facilitating bending and minimizing thickness increases in the overlapping regions between the third region 143 and the third region 143.

Figure 5:
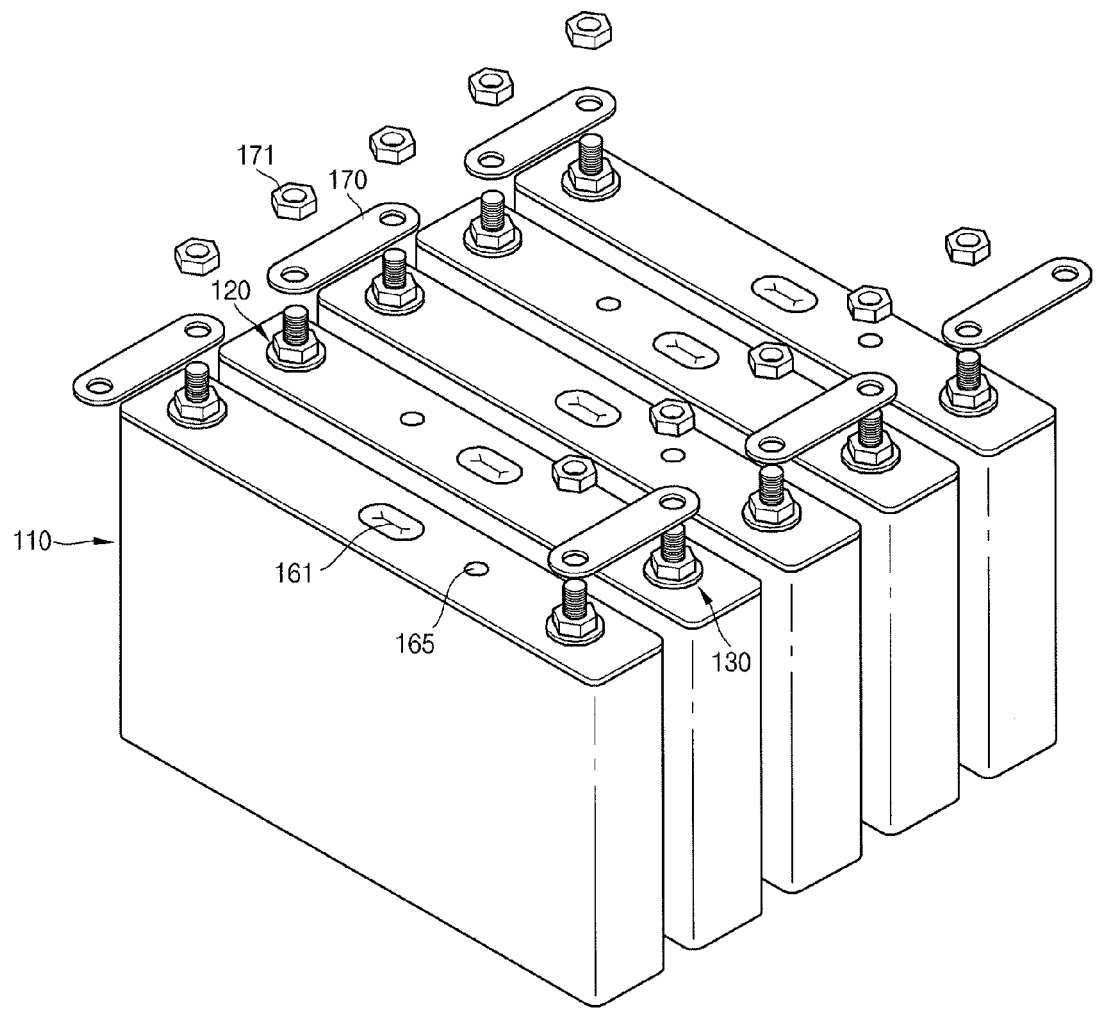
FIG. 5 illustrates a perspective view of a state in which a plurality of secondary batteries are connected to each other in series by bus bars.

FIG. 5 illustrates a perspective view of a state in which a plurality of secondary batteries are connected to each other in series by bus bars.

As shown in FIG. 5, the plurality of secondary batteries 100 may be stacked in a horizontal direction. Each of the plurality of secondary batteries 100 may include a first electrode terminal (e.g., positive electrode terminal) 120 and a second electrode terminal (e.g., negative electrode terminal) 130. The secondary batteries may be arranged such that opposite polarity terminals of adjacent secondary batteries face or are aligned with each other.

The first electrode terminal 120 of one secondary battery may be electrically connected to the second electrode terminal 130 of another secondary battery adjacent thereto by bus bars 170. Further, second fastening members 171 may be engaged with the first electrode terminal 120 and the second electrode terminal 130, respectively, so that the bus bars 170 are firmly coupled with the first electrode terminal 120 and the second electrode terminal 130. In this way, the plurality of secondary batteries 100 may be connected to each other in series through the bus bars 170.

Although FIG. 5 shows that the plurality of secondary batteries 100 are connected to each other in series, in an implementation, they may be connected to each other in parallel.

Figure 6:
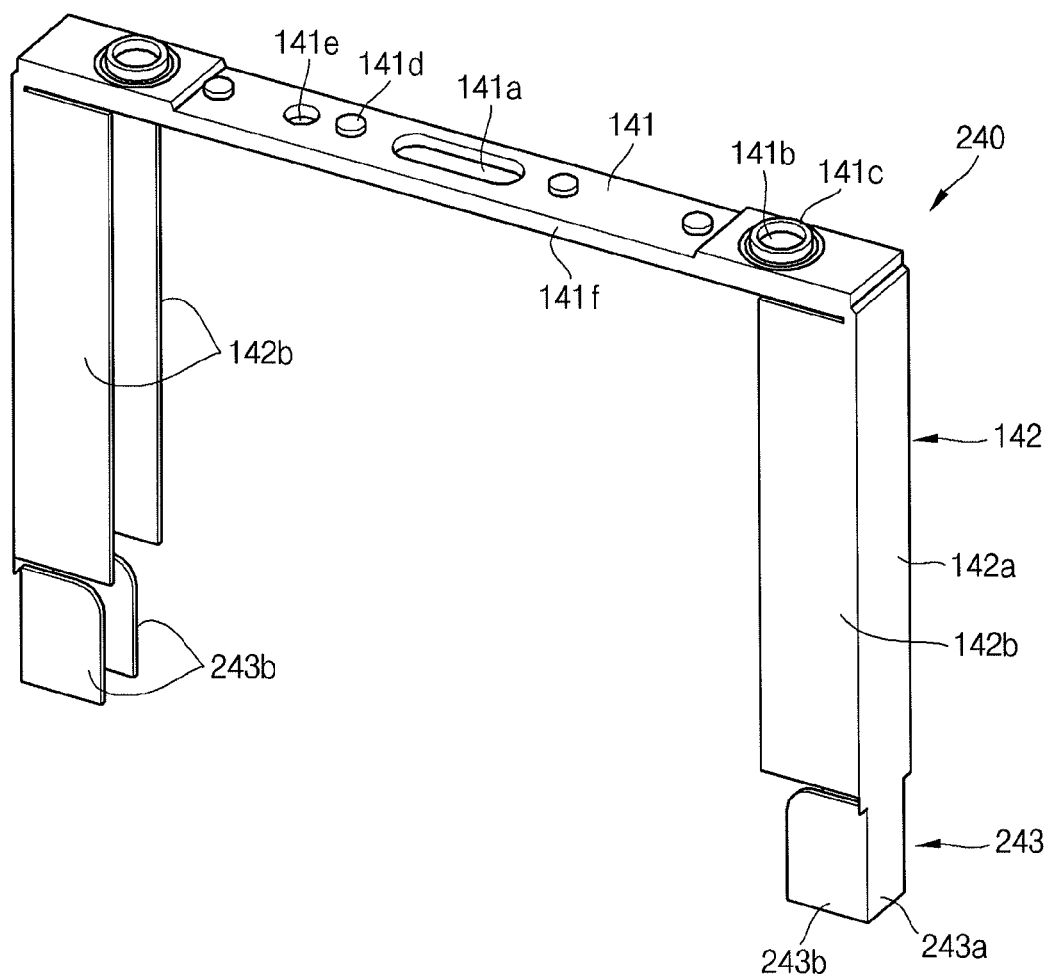
FIG. 6 illustrates a perspective view of an insulation member according to another embodiment.

FIG. 6 illustrates a perspective view of an insulation member according to another embodiment.

The insulation member 240 according to the present embodiment is similar to the insulation member 140 of the previous embodiment, except for the configuration of the third region 243. Accordingly, a repeated description of like elements is omitted.

The insulation member 240 according to the present embodiment may include the third region 243. The third region 243 may include a third region back plate 243a and a third region lateral plate 243b. The third region 243 may extend from ends of the second region 142. For example, the third region back plate 243a may extend from an end of the second region back plate 142a. A width of the third region back plate 243a may be narrower than a width of the second region back plate 142a. Accordingly, in an assembled condition (not illustrated), the third region 243 (including the third region back plate 243a and the third region lateral plate 243b) may be bent inwardly and may be encompassed by the second region 142 without interfering therewith.

The embodiments provide a secondary battery having improved insulating properties between an electrode assembly and a case as well as facilitated exhaustion of the gas generated from the electrode assembly and/or electrolyte during overcharging.

In the secondary battery according to an embodiment, an insulation member may be formed at locations corresponding to opposite side regions and top and bottom regions of the electrode assembly. Thus, an electric short between the electrode assembly and the case may be reduced or prevented. For example, the secondary battery according to an embodiment may help improve an insulating property between the electrode assembly and the case.

In addition, in the secondary battery according to an embodiment, opposing side regions and top and bottom regions of the electrode assembly may be substantially or mostly surrounded by the insulation member, thereby protecting the electrode assembly against external shocks in a secured manner.

Further, when the secondary battery according to an embodiment is overcharged, gas generated from the electrode assembly and/or electrolyte may be guided to a safety vent in the cap plate along a gas passage between the electrode assembly and the insulation member. Accordingly, when the secondary battery is overcharged, the safety vent may be opened rapidly and accurately due to the gas, thereby improving the reliability of the secondary battery with respect to overcharging.

In addition, according to an embodiment, a terminal protrusion having an insulation member terminal hole in the insulation member may serve as an insulator that insulates the cap plate and the electrode terminal. Thus, an additional insulation member for insulating the cap plate and the electrode terminal may not be separately required. For example, in the secondary battery according to an embodiment, the insulation member may serve to insulate the electrode assembly from the case (or the cap plate) and to insulate the electrode terminal from the cap plate, thereby reducing the number of components.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
an electrode assembly, the electrode assembly including an uncoated region at ends thereof;
a case accommodating the electrode assembly;
a cap plate coupled with the case; and
an insulation member in the case, the insulation member including:
a first region between the electrode assembly and the cap plate, and
a second region between the uncoated region of the electrode assembly and an inner surface of the case,
wherein the first region includes a terminal protrusion in a cap plate terminal hole of the cap plate, the terminal protrusion including an insulation member terminal hole therethrough, and the terminal protrusion being integrally extended from the first region, and
wherein the first region includes a thick rim part, the thick rim part protruding downwardly from opposing long sides of the first region and continuously extending along the opposing long sides from one end of the first region at one end of the cap plate toward another end of the first region at another end of the cap plate such that the first region including, the thick rim part continuously extends across a center line of the cap plate and in a lengthwise direction of the cap plate,
wherein the lengthwise direction of the cap plate extends along a longest side of the can plate, and
wherein the center line of the cap plate bisects the cap plate in a direction orthogonal to the lengthwise direction.

2. The secondary battery as claimed in claim 1, wherein the insulation member is coupled with the cap plate.

3. The secondary battery as claimed in claim 2, wherein the first region includes:
a coupling protrusion, the coupling protrusion being coupled with a coupling recess of the cap plate.

4. The secondary battery as claimed in claim 3, wherein the first region further includes;
a vent hole under a vent plate of the cap plate,
an insulation member injection hole under a cap plate injection hole of the cap plate.

5. The secondary battery as claimed in claim 4, wherein the insulation member forms a gas passage that directs gas generated during charging/discharging of the secondary battery toward the vent hole.

6. The secondary battery as claimed in claim 1, wherein the second region extends downwardly from opposing short sides of the first region, the opposing short sides of the first region being narrower than the opposing long sides of the first region.

7. The secondary battery as claimed in claim 6, wherein the second region includes:
a second region back plate between the uncoated region of the electrode assembly and a narrow side of the case, and
a second region lateral plate extending inwardly from the second region back plate.

8. The secondary battery as claimed in claim 7, wherein the second region lateral plate extends between sides of the uncoated region of the electrode assembly and a wide side of the case.

9. The secondary battery as claimed in claim 7, wherein the second region includes a reinforcing member at a junction between the second region back plate and the second region lateral plate.

10. The secondary battery as claimed in claim 7, wherein the second region back plate has a width equal to or greater than a width of the uncoated region.

11. The secondary battery as claimed in claim 7, wherein the second region lateral plate extends to cover an entire wide side of the electrode assembly.

12. The secondary battery as claimed in claim 1, wherein the insulation member further includes a third region opposite to the fast region, the third region being between a bottom side of the electrode assembly and the inner surface of the case.

13. The secondary battery as claimed in claim 12, wherein the third region extends inwardly from ends of the second region.

14. The secondary battery as claimed in claim 13, wherein the third region includes a third region bottom plate between the uncoated region of the electrode assembly and a bottom surface of the case.

15. The secondary battery as claimed in claim 14, wherein the third region bottom plate has a width equal to or greater than a width of the uncoated region of the electrode assembly.

16. The secondary battery as claimed in claim 14, wherein the third region bottom plate extends to cover an entire bottom side of the electrode assembly.

17. The secondary battery as claimed in claim 12, wherein the third region is foldable from one position longitudinal with the second region in an unassembled condition to another position normal to the second region in an assembled condition.

18. The secondary battery as claimed in claim 1, wherein the insulation member is formed from a phenol resin, polyphenylene sulfide, polyether ether ketone, polyether ketone, polyoxymethylene, or combinations thereof.

19. The secondary battery as claimed in claim 1, wherein the insulation member has a one-piece, integrally formed structure.

* * * * *